US006935326B1

(12) United States Patent
Willis

(10) Patent No.: US 6,935,326 B1
(45) Date of Patent: Aug. 30, 2005

(54) PORTABLE BARBECUE PIT

(76) Inventor: Willie E. Willis, P.O. Box 162, York, AL (US) 36925

( * ) Notice: Subject to any disclaimer, the term of this patent is extended or adjusted under 35 U.S.C. 154(b) by 0 days.

(21) Appl. No.: 10/800,437

(22) Filed: Mar. 15, 2004

(51) Int. Cl.$^7$ ................................................ F24C 1/16
(52) U.S. Cl. ...................... 126/9 R; 126/9 A; 126/9 B; 126/30
(58) Field of Search ................................ 126/25 R, 29, 126/30, 9 R, 9 A, 9 B

(56) References Cited

U.S. PATENT DOCUMENTS

| | | |
|---|---|---|
| 1,333,335 A | 3/1920 | O'Kane |
| D142,866 S | 11/1945 | Johannsen |
| 2,757,566 A | 8/1956 | Werden |
| 3,064,637 A | 11/1962 | Thomson |
| 4,508,096 A * | 4/1985 | Slattery ...................... 126/9 R |
| 4,920,950 A | 5/1990 | Johnson |
| 4,936,285 A | 6/1990 | Hait |
| 6,321,640 B1 * | 11/2001 | Tseng ......................... 126/9 R |
| 6,439,111 B1 | 8/2002 | Lu |
| 6,708,604 B1 * | 3/2004 | Deichler, Jr. ................ 126/9 R |

* cited by examiner

Primary Examiner—Jiping Lu

(57) ABSTRACT

Portable barbecue pits grill a large quantity of food outdoors while remaining portable. A grill grate is supported by a rear wall and two sidewalls. The grill grate is removably connected to the top of the sidewalls by grill latches in the form of hasps. Two doors are hingedly attached to the sidewalls underneath the front of the grill grate. Door flaps are hingedly attached to the bottom of the doors. A lid with handles attached to its front and rear can be propped open on top of grill grate 12 by a lid support 18, or the lid can removably cover the grill grate 12. The lid also serves as a base for transporting the collapsed portable barbecue pit. The lid, rear wall, and sidewalls have tubular steel frames covered by sheet steel.

5 Claims, 4 Drawing Sheets

PORTABLE BARBECUE PIT

BACKGROUND OF THE INVENTION

1. Field of the Invention

The present invention relates to a portable barbecue pit for use in connection with cooking. The portable barbecue pit has particular utility in connection with grilling a large quantity of food outdoors while remaining portable.

2. Description of the Prior Art

Portable barbecue pits are desirable for grilling a large quantity of food outdoors while remaining portable. Many occasions, such as family reunions, picnics, barbecues, and company functions require large amounts of food to be cooked outdoors. Purchasing, transporting, and using multiple grills can be an expensive and time-consuming approach to addressing this need. Most large grills are either not portable at all or can be moved only with great difficulty. Portable barbecue pits overcome these obstacles by allowing users to cook a large quantity of food on a single grill while also being easy to transport.

The use of portable barbecues is known in the prior art. For example, U.S. Pat. No. 3,064,637 to Thomson discloses a portable barbecue. However, the Thomson '637 patent does not have a rear wall, and has further drawbacks of lacking doors.

U.S. Pat. No. 2,747,566 to Werden discloses a collapsible camp cooker that enables fires to be safely built. However, the Werden '566 patent does not have door flaps, and additionally does not have a lid.

Similarly, U.S. Pat. No. 1,333,335 to O'Kane discloses a camp stove that is foldable to form a compact package convenient for handling, transportation, or storage. However, the O'Kane '335 patent does not have doors, and does not have a lid.

In addition, U.S. Pat. No. Des. 142,866 to Johannsen discloses a portable foldable grill that grills food. However, the Johannsen '866 patent does not have doors, and also does not have a lid.

Furthermore, U.S. Pat. No. 4,920,950 to Johnson discloses a camp stove that cooks meat or other food. However, the Johnson '950 patent does not have doors, and further lacks a lid.

U.S. Pat. No. 4,936,285 to Hait discloses a reflector stove that can be folded to a compact collapsed, easily portable form. However, the Hait '285 patent does not have doors, and has the additional deficiency of lacking a lid.

Lastly, U.S. Pat. No. 6,439,111 to Lu discloses a collapsible barbecue grill that can be quickly extended in use or folded for convenient carrying and storage. However, the Lu '111 patent does not have doors, and also does not have a lid.

While the above-described devices fulfill their respective, particular objectives and requirements, the aforementioned patents do not describe a portable barbecue pit that allows grilling a large quantity of food outdoors while remaining portable. The Thomson '637 patent makes no provision for a rear wall. The Thomson '637 patent, the O'Kane '335 patent, the Johannsen '866 patent, the Johnson '950 patent, the Hait '285 patent, and the Lu '111 patent lack doors. The Werden '566 patent omits door flaps. The Werden '566 patent, the O'Kane '335 patent, the Johannsen '866 patent, the Johnson '950 patent, the Hait '285 patent, and the Lu '111 patent do not have a lid.

Therefore, a need exists for a new and improved portable barbecue pit that can be used for grilling a large quantity of food outdoors while remaining portable. In this regard, the present invention substantially fulfills this need. In this respect, the portable barbecue pit according to the present invention substantially departs from the conventional concepts and designs of the prior art, and in doing so provides an apparatus primarily developed for the purpose of grilling a large quantity of food outdoors while remaining portable.

SUMMARY OF THE INVENTION

In view of the foregoing disadvantages inherent in the known types of portable barbecues now present in the prior art, the present invention provides an improved portable barbecue pit, and overcomes the above-mentioned disadvantages and drawbacks of the prior art. As such, the general purpose of the present invention, which will be described subsequently in greater detail, is to provide a new and improved portable barbecue pit which has all the advantages of the prior art mentioned heretofore and many novel features that result in a portable barbecue pit which is not anticipated, rendered obvious, suggested, or even implied by the prior art, either alone or in any combination thereof.

To attain this, the present invention essentially comprises a grill grate with its top frictionally engaged with the bottom of a lid, the back of its bottom frictionally engaged with the top of a rear wall, and the opposing sides of its bottom frictionally engaged with the top of a plurality of sidewalls. A plurality of handles are attached to the front and the back of the lid. A plurality of doors are hingedly connected by door hinges to one of the sides of each of the sidewalls.

There has thus been outlined, rather broadly, the more important features of the invention in order that the detailed description thereof that follows may be better understood and in order that the present contribution to the art may be better appreciated.

The invention may also include a plurality of grill latches removably connecting the opposing sides of the grill grate to the top of the sidewalls. The grill latches may be hasps. There may be a plurality of door flaps hingedly attached by door flap hinges to the bottom of the doors. There may be a lid support with one end frictionally engaged with the bottom of the lid and its opposing end frictionally engaged with the top of the grill grate. The portable barbecue pit may be selected from the group consisting of steel, aluminum, and titanium. The lid, rear wall, and sidewalls may be of tubular frame construction with attached sheets. The portable barbecue pit may be about 50 in. high, 74 in. long, and 47½ in. wide. The rear wall, the sidewalls, the doors, and the grill grate may be stacked atop the lid to allow the portable barbecue pit be transported using the handles. There are, of course, additional features of the invention that will be described hereinafter and which will form the subject matter of the claims attached.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable barbecue pit that has all of the advantages of the prior art portable barbecues and none of the disadvantages.

It is another object of the present invention to provide a new and improved portable barbecue pit that may be easily and efficiently manufactured and marketed.

An even further object of the present invention is to provide a new and improved portable barbecue pit that has a low cost of manufacture with regard to both materials and labor, and which accordingly is then susceptible of low prices of sale to the consuming public, thereby making such portable barbecue pit economically available to the buying public.

Still another object of the present invention is to provide a new portable barbecue pit that provides in the apparatuses and methods of the prior art some of the advantages thereof, while simultaneously overcoming some of the disadvantages normally associated therewith.

Even still another object of the present invention is to provide a portable barbecue pit for grilling a large quantity of food outdoors while remaining portable. This allows the user to barbecue a large quantity of food on a single grill.

Still yet another object of the present invention is to provide a portable barbecue pit for grilling a large quantity of food outdoors while remaining portable. This makes it possible to transport the portable barbecue pit.

An additional object of the present invention is to provide a portable barbecue pit for grilling a large quantity of food outdoors while remaining portable. This makes the portable barbecue pit collapsible.

A further object of the present invention is to provide a portable barbecue pit for grilling a large quantity of food outdoors while remaining portable. This allows the user to prop the lid open.

Lastly, it is an object of the present invention to provide a new and improved portable barbecue pit for grilling a large quantity of food outdoors while remaining portable.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
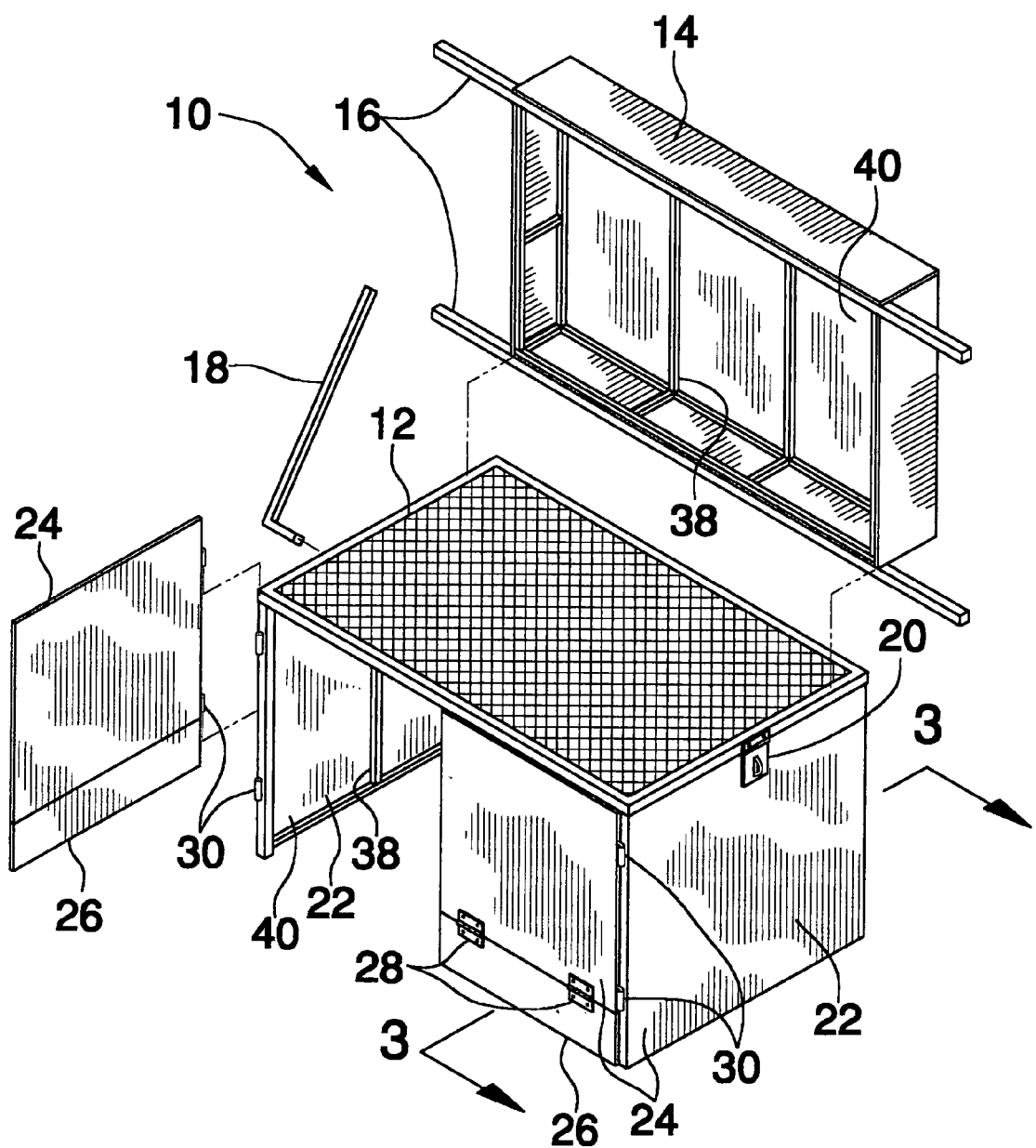
FIG. 1 is a top perspective view of the current embodiment of the portable barbecue pit constructed in accordance with the principles of the present invention.

Referring now to the drawings, and particularly to FIGS. 1–6, a current embodiment of the portable barbecue pit of the present invention is shown and generally designated by the reference numeral 10.

In FIG. 1, a new and improved portable barbecue pit 10 of the present invention for grilling a large quantity of food outdoors while remaining portable is illustrated and will be described. More particularly, the portable barbecue pit 10 has a grill grate 12 supported by two sidewalls 22 and a rear wall 36 (not shown). Grill grate 12 is removably connected to sidewalls 22 by grill latches 20 (only one of which is visible). Two doors 24 are hingedly attached by door hinges 30 to one side of each of the sidewalls 22. Each door 24 has a door flap 26 hingedly attached to its bottom by door flap hinges 28. A lid 14 can be placed on top of grill grate 12. The lid 14 has handles 16 attached to its front and rear. A lid support 18 can have one end resting against grill grate 12 and its opposing end frictionally engaged with the bottom of lid 14 to prop lid 14 open. The lid 14, sidewalls 22, and rear wall 36 are constructed from frames 38 covered by sheets 40. In the current embodiment, frames 38 are made of tubular steel to minimize weight while retaining strength. Sheets 40 are made of steel in the current embodiment. Grill grate 12, doors 24, and door flaps 26 are made of steel in the current embodiment, and grill latches 20 are hasps.

Figure 2:
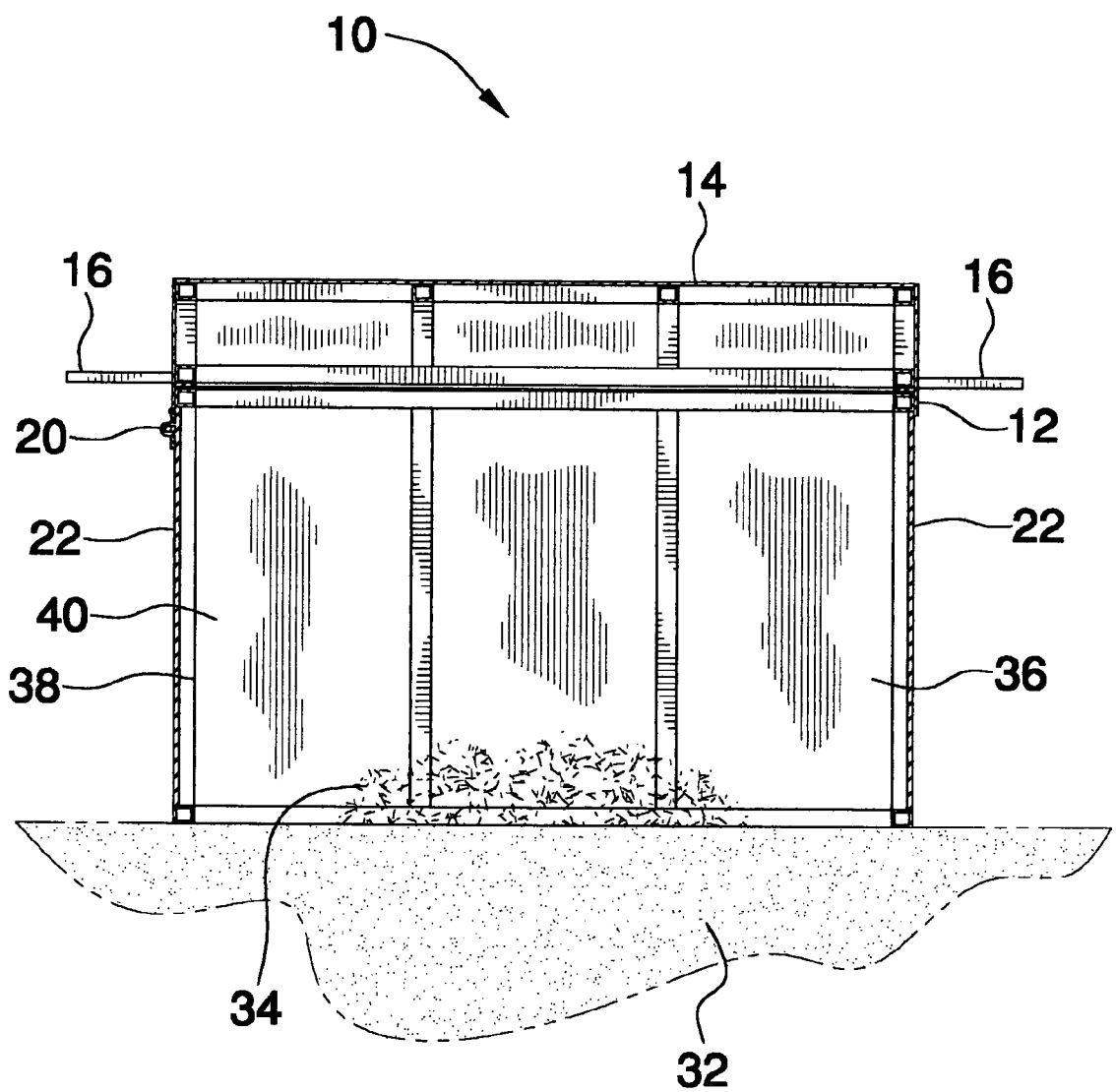
FIG. 2 is a front side sectional view of the portable barbecue pit of the present invention.

Moving on to FIG. 2, a new and improved portable barbecue pit 10 of the present invention for grilling a large quantity of food outdoors while remaining portable is illustrated and will be described. More particularly, the portable barbecue pit 10 has a lid 14 with handles 16 removably covering grill grate 12. Grill grate 12 is supported by rear wall 36 and sidewalls 22. The rear wall 36 and sidewalls 22 are constructed from frames 38 covered by sheets 40. In use, the portable barbecue pit 10 rests on the ground 32 and wood chips 34 are placed within the confines of the rear wall 36, sidewalls 22, and doors 24 (not shown). The wood chips 34, preferably oak chips or hickory chips, are burned to heat grill grate 12. Note that the broken lines illustrating ground 32 and wood chips 34 are for illustrative purposes only and are not part of the current invention.

Figure 3:
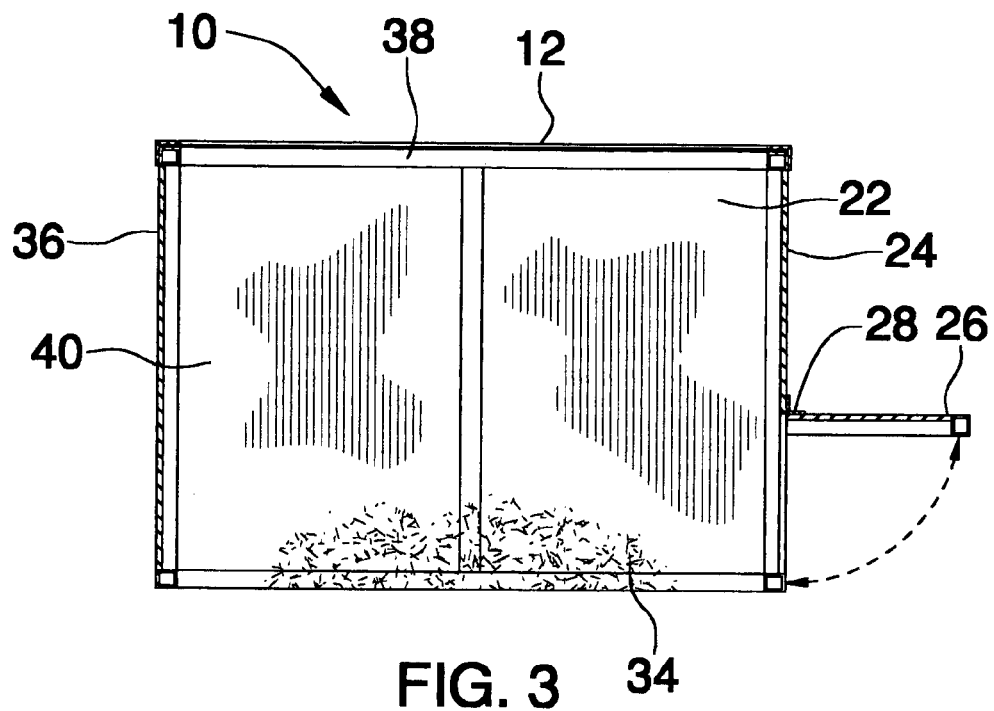
FIG. 3 is a side sectional view of the portable barbecue pit of the present invention.

Continuing with FIG. 3, a new and improved portable barbecue pit 10 of the present invention for grilling a large quantity of food outdoors while remaining portable is illustrated and will be described. More particularly, the portable barbecue pit 10 has a grill grate 12 supported by a sidewall 22 and rear wall 36. Wood chips 34 are placed beneath grill grate 12 through door 24 to heat grill grate 12. The door flap 26 can be pivoted about door flap hinge 28, as illustrated by the double-headed arrow, to allow air to enter the interior of the portable barbecue pit 10 to facilitate combustion of wood chips 34. Sidewall 22 and rear wall 36 are constructed from frames 38 covered by sheets 40. Note that the broken lines illustrating wood chips 34 are for illustrative purposes only and are not part of the current invention.

Figure 4:
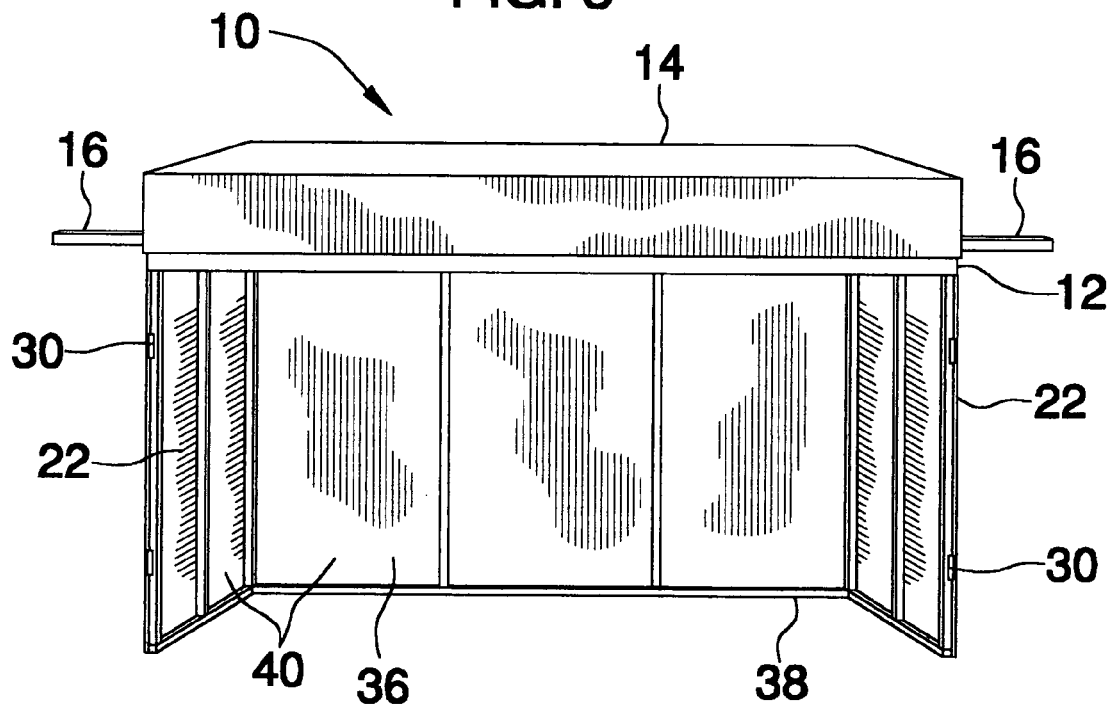
FIG. 4 is a front side view of the portable barbecue pit of the present invention.

In FIG. 4, a new and improved portable barbecue pit 10 of the present invention for grilling a large quantity of food outdoors while remaining portable is illustrated and will be described. More particularly, the portable barbecue pit 10 has a lid 14 removably covering grill grate 12. Handles 16 can be used to lift and lower lid 14, and are therefore made of a nonconductive material, such as wood, so that they do not become hot when lid 14 is placed on top of grill grate 12. Doors 24 (not shown) have been removed from door hinges 30 to expose the interior of the portable barbecue pit 10. Two sidewalls 22 and a rear wall 36 support the grill grate 12. The sidewalls 22 and rear wall 36 are constructed from frames 38 and sheets 40.

Figure 5:
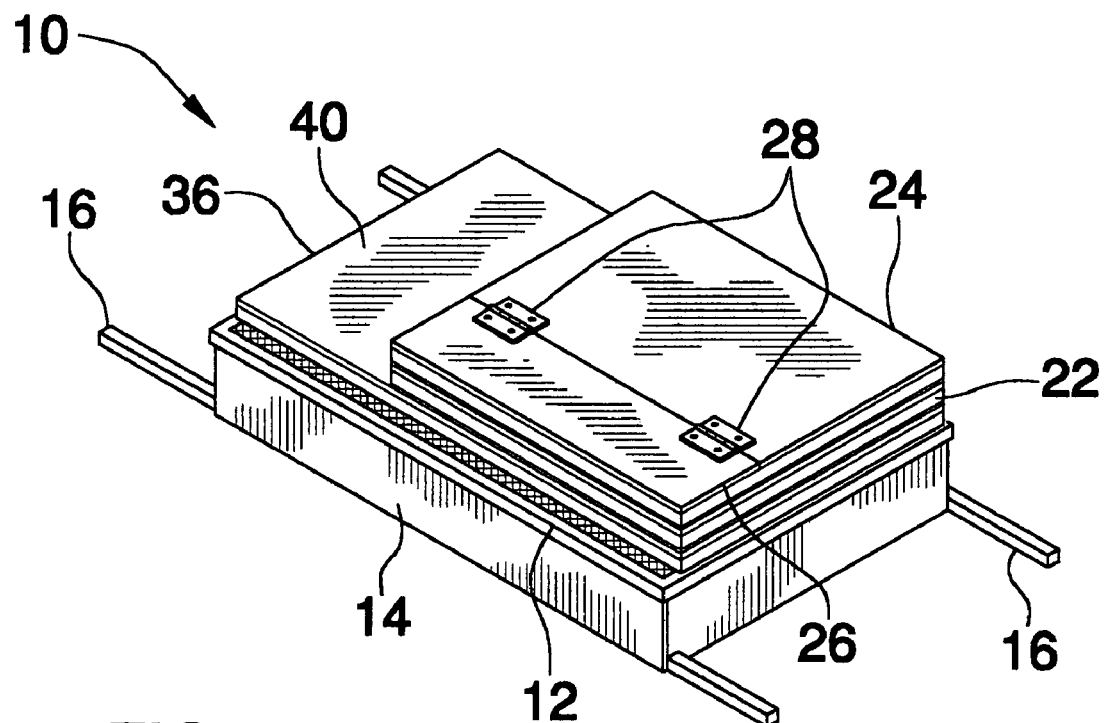
FIG. 5 is a top perspective view of the portable barbecue pit of the present invention.

Furthermore, in FIG. 5, a new and improved portable barbecue pit 10 of the present invention for grilling a large quantity of food outdoors while remaining portable is illustrated and will be described. More particularly, the portable barbecue pit 10 is illustrated in its collapsed position with grill grate 12, rear wall 36, sidewalls 22, and doors 24 stacked atop lid 14. Handles 16 can be used to transport the entire portable barbecue pit 10 from one location to another. The door flap 26 hingedly attached by door flap hinges 28 to the bottom of door 24 is visible.

Figure 6:
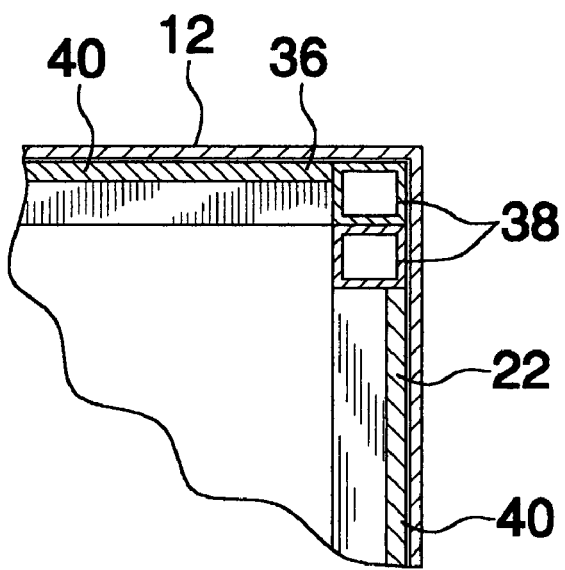
FIG. 6 is a top sectional view of the rear wall of the present invention.

Concluding with FIG. 6, a new and improved rear wall 36 of the present invention for grilling a large quantity of food outdoors while remaining portable is illustrated and will be described. More particularly, the rear wall 36 has one side connected to one side of sidewall 22. The rear wall 36 and sidewall 22 consist of frames 38 covered by sheets 40.

In use, it can now be understood that the user uses handles 16 to carry the portable barbecue pit 10 to the desired location. The sidewalls 22 are connected to the rear wall 36, and the doors 24 are hung on door hinges 30. The user then places grill grate 12 on top of rear wall 36 and sidewalls 22 and removably secures it to sidewalls 22 using grill latches 20. The user then places wood chips 34 within the interior of the portable barbecue pit 10, ignites them, and closes doors 24. The user opens door flaps 26 to allow air to enter the interior of the portable barbecue pit 10 to facilitate the combustion of wood chips 34. Lid 14 can be propped open atop grill grate 12 using lid support 18 or can removably cover grill grate 12 during the cooking process. After cooking is completed and the portable barbecue pit 10 has cooled, the user can detach grill grate 12 from the sidewalls 22, remove doors 24 from their hinges, and detach sidewalls 22 from rear wall 36. The user then stacks grill grate 12, rear wall 36, sidewalls 22, and doors 24 atop lid 14 to prepare the portable barbecue pit 10 for transport.

While a current embodiment of the portable barbecue pit has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy and heat-resistant material such as aluminum or titanium may be used instead of the steel described. Also, the wood chips may also be charcoal briquettes, chunks of wood, or similar combustible material. Furthermore, a wide variety of sizes may be used instead of the 50 in. high, 74 in. long, and 47½ in. wide described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A portable barbecue pit comprising:
   a grill grate having a top, a bottom, a front, a rear, and opposing sides;
   a lid having a front, a back, a top, and a bottom with said bottom frictionally engaged with said top of said grill grate;
   a plurality of handles attached to said front and said back of said lid;
   a rear wall having a top frictionally engaged with said back of said bottom of said grill grate;
   a plurality of sidewalls having a top and opposing sides with said top frictionally engaged with said opposing sides of said bottom of said grill grate;
   a plurality of doors having opposing sides and a bottom with one of said sides hingedly connected by door hinges to one of said sides of said sidewalls; and
   a plurality of door flaps hingedly attached by door flap hinges to said bottom of said doors.

2. A portable barbecue pit comprising:
   a rear wall having opposing sides and a top;
   a plurality of sidewalls having opposing sides and a top with one of said sides attached to one of said sides of said rear wall;
   a plurality of doors having opposing sides and a bottom with one of said opposing sides hingedly attached by door hinges to said opposing side of said sidewalls;
   a grill grate having a front, a back, a top, a bottom, and opposing sides with said back of said bottom frictionally engaged with said top of said rear wall and said opposing sides of said bottom frictionally engaged with said top of said sidewalls;
   a lid having a front, a back, a top, and a bottom with said bottom frictionally engaged with said top of said grill grate; and
   a plurality of handles attached to said front and said back of said bottom of said lid; and
   a plurality of door flaps hingedly attached by door flap hinges to said bottom of said doors.

3. A portable barbecue pit comprising:
   a lid having a front, a back, a top, and a bottom;
   a grill grate having a top, a bottom, a front, a rear, and opposing sides with said top frictionally engaged with said bottom of said lid;
   a plurality of handles attached to said front and said back of said lid;
   a rear wall having a top frictionally engaged with said back of said bottom of said grill grate;
   a plurality of sidewalls having a top and opposing sides with said top frictionally engaged with said opposing sides of said bottom of said grill grate;
   a plurality of hasps removably connecting said opposing sides of said grill grate to said top of said sidewalls;
   a plurality of doors having opposing sides and a bottom with one of said sides hingedly connected to one of said sides of said sidewalls; and
   a plurality of door flaps hingedly attached to said bottom of said doors;

wherein said rear wall, said sidewalls, said doors, and said grill grate can be stacked atop said lid to allow the portable barbecue pit to be transported using said handles.

4. The portable barbecue pit as defined in claim 3, further comprising a lid support having opposing ends with one end frictionally engaged with said bottom of said lid and said opposing end frictionally engaged with said top of said grill grate.

5. The portable barbecue pit as defined in claim 4, wherein said lid, said rear wall, and said sidewalls are of tubular frame construction with attached sheets.

* * * * *